(12) United States Patent
Oakley et al.

(10) Patent No.: US 8,375,302 B2
(45) Date of Patent: Feb. 12, 2013

(54) EXAMPLE BASED VIDEO EDITING

(75) Inventors: Randolph Bruce Oakley, Bellevue, WA (US); Michael J. Patten, Sammamish, WA (US); Andrew Kutruff, Seattle, WA (US); Russell Scott Randall, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 729 days.

(21) Appl. No.: 11/560,959

(22) Filed: Nov. 17, 2006

(65) Prior Publication Data

US 2008/0120550 A1    May 22, 2008

(51) Int. Cl.
*G06F 17/00* (2006.01)
*G06F 3/00* (2006.01)
*G06F 17/20* (2006.01)

(52) U.S. Cl. .................................. 715/723; 715/202

(58) Field of Classification Search .................. 715/202, 715/723

See application file for complete search history.

(56) References Cited

U.S. PATENT DOCUMENTS

| | | | |
|---|---|---|---|
| 5,604,857 A * | 2/1997 | Walmsley | 345/473 |
| 6,016,380 A | 1/2000 | Norton | |
| 6,085,020 A * | 7/2000 | Saito et al. | 386/327 |
| 6,137,483 A | 10/2000 | Kiyono et al. | |
| 6,424,789 B1 | 7/2002 | Abdel-Mottaleb | |
| 6,721,361 B1 | 4/2004 | Covell et al. | |
| 6,882,793 B1 | 4/2005 | Fu et al. | |
| 6,928,613 B1 * | 8/2005 | Ishii et al. | 715/726 |
| 6,954,894 B1 | 10/2005 | Balnaves et al. | |
| 6,970,639 B1 | 11/2005 | McGrath et al. | |
| 7,013,432 B2 * | 3/2006 | Taylor et al. | 715/788 |
| 7,062,532 B1 | 6/2006 | Sweat et al. | |
| 7,124,366 B2 * | 10/2006 | Foreman et al. | 715/719 |
| 7,614,012 B1 * | 11/2009 | Dulaney | 715/838 |
| 7,643,723 B2 * | 1/2010 | Ishii | 386/282 |
| 7,668,438 B2 * | 2/2010 | Fu et al. | 386/200 |
| 7,683,940 B2 * | 3/2010 | Fleming | 348/222.1 |
| 7,739,599 B2 * | 6/2010 | Patten et al. | 715/723 |
| 7,822,643 B2 * | 10/2010 | Negley | 715/723 |
| 7,861,169 B2 * | 12/2010 | Hull et al. | 715/704 |
| 8,204,750 B2 * | 6/2012 | DeWitt | 704/272 |
| 2001/0040592 A1 * | 11/2001 | Foreman et al. | 345/723 |
| 2001/0041020 A1 | 11/2001 | Shaffer et al. | |
| 2002/0122067 A1 | 9/2002 | Geigel et al. | |

(Continued)

FOREIGN PATENT DOCUMENTS

JP    05290548    11/1993

OTHER PUBLICATIONS

Adams, et al., "Weaving Stories in Digital Media: When Spielberg Makes Home Movies," MM'03, 2003, pp. 207-210, ACM Publishing, USA.

(Continued)

*Primary Examiner* — Boris Pesin
*Assistant Examiner* — Ece Hur
(74) *Attorney, Agent, or Firm* — Senniger Powers LLP

(57) ABSTRACT

Enabling creation of a user-specific storyboard style based on a storyboard edited by a user. Metadata defined by analyzing the editing decisions made by the user and the media content associated with the storyboard represents the user-specific style. The user-specific style may be applied to other media content to produce a fully edited storyboard that matches the style of the example storyboard from which the user-specific style was created. The produced storyboard is combined with the other media content to produce audio/video data for consumption by the user.

16 Claims, 5 Drawing Sheets

U.S. PATENT DOCUMENTS

| | | | |
|---|---|---|---|
| 2003/0001846 A1 | 1/2003 | Davis et al. | |
| 2003/0052909 A1* | 3/2003 | Mo et al. | 345/716 |
| 2003/0052910 A1 | 3/2003 | Shiiyama | |
| 2003/0122873 A1* | 7/2003 | Dieberger et al. | 345/764 |
| 2003/0210886 A1* | 11/2003 | Li et al. | 386/46 |
| 2003/0215214 A1 | 11/2003 | Ma | |
| 2003/0222899 A1 | 12/2003 | Alvesalo | |
| 2003/0234805 A1 | 12/2003 | Toyama et al. | |
| 2004/0001106 A1 | 1/2004 | Deutscher et al. | |
| 2004/0004665 A1 | 1/2004 | Kashiwa | |
| 2004/0085341 A1 | 5/2004 | Hua et al. | |
| 2004/0128308 A1 | 7/2004 | Obrador | |
| 2004/0223747 A1 | 11/2004 | Otala et al. | |
| 2005/0053356 A1 | 3/2005 | Mate et al. | |
| 2005/0249080 A1 | 11/2005 | Foote et al. | |
| 2005/0273470 A1 | 12/2005 | Heigold | |
| 2005/0281535 A1* | 12/2005 | Fu et al. | 386/69 |
| 2006/0026529 A1 | 2/2006 | Paulsen et al. | |
| 2006/0284978 A1* | 12/2006 | Girgensohn et al. | 348/143 |
| 2007/0009231 A1 | 1/2007 | Shinkai et al. | |
| 2007/0074115 A1* | 3/2007 | Patten et al. | 715/716 |
| 2007/0168543 A1 | 7/2007 | Krikorian et al. | |
| 2007/0218448 A1* | 9/2007 | Harmeyer et al. | 434/350 |
| 2007/0230807 A1 | 10/2007 | Shiiyama | |
| 2008/0256432 A1* | 10/2008 | Sambandam et al. | 715/212 |
| 2010/0005379 A1* | 1/2010 | Lanahan et al. | 715/202 |
| 2010/0115410 A1* | 5/2010 | Fu et al. | 715/721 |

OTHER PUBLICATIONS

O'Brien-Strain et al., "Using Film-Making Techniques to Synthesize Compelling Video Shows from Consumer Photographs," Hewlett-Packard Development Company, LP, 2005, 4 pages, USA.

Hua et al., "LazyCut-Content-Aware Template-Based Video Authoring," MM'05, 2005, 2 pages, ACM Publishing, Singapore.

Davis, "Active Capture: Automatic Direction for Automatic Movies," MM'03, 2003, pp. 602-603, ACM Publishing, USA.

* cited by examiner

EXAMPLE BASED VIDEO EDITING

BACKGROUND

Creating professional-looking home movies is a difficult task. Existing video editing systems are capable of creating aesthetically pleasing, professional-looking videos. These systems, however, are either too complex and difficult for users to easily learn and use in a time efficient manner, or too automated. With some existing systems, users are required to manually assemble a variety of different elements including video clips, audio clips, titles, effects, narration and background music. Combining these elements into a professional-looking home movie requires advanced skills and a significant time investment.

In addition, editing techniques vary from user to user. For example, a user who records a child's soccer game wants to create a highlight video that is brief and only focuses on key events such as defensive plays and goals. In this scenario, the user chooses video clips that are of high quality, contain a key event, and are focused on a particular child. The user may delete ground shot scenes, blurry scenes, and out of focus scenes. Since the video is a highlights video, the user shortens most of the video clips.

Another user, however, may edit a video of the same soccer game by creating a home movie that represents the entire game. In this case, the user only removes portions of video clips that are extremely poor in quality (e.g., very dark shots, shots of the ground, or blurry shots). The user in this scenario performs very little editing since the focus is to capture the entire event. Key events may be highlighted by applying a video effect to the video clip where a player makes a goal.

Each of the above users may make similar decisions when editing other videos. For example, the users are likely to use the same style when editing subsequent videos of soccer games. Unfortunately, the users must repeat the entire video editing process even though the same style and technique will be used again. Such repetition is time consuming, burdensome, and discouraging.

Other existing systems are completely automated. Features of such existing systems allow the user to automatically create a complete movie with little or no user interaction. Such existing systems have predefined styles, but these styles are limited and often do not meet the needs of the individual user. For example, users may have different goals and objects when creating a home movie. The built-in templates and predefined styles in existing systems confine the user to a particular style and do not provide the level of customization and flexibility needed to enable the user to create a professional-looking video that focuses on user-specific portions of interest.

Some existing video editing systems allow the user to replace sections of a video timeline or storyboard with different video clips. For example, stock footage, effects, and transitions may be preserved from one project to another, but the user must still manually choose what clips to include and edit the chosen clips. This approach results in videos that are very rigid and uniform.

SUMMARY

Embodiments of the invention enable creation of a user-specific storyboard style from analysis of a storyboard edited by a user. In an embodiment, editing decisions from the user are analyzed along with media content associated with the storyboard to define metadata representing the user-specific style. The user-specific style is applied to other media content to produce another storyboard according to the user-specific style. The other storyboard is combined with the other media content to produce audio/video data for consumption by the user.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
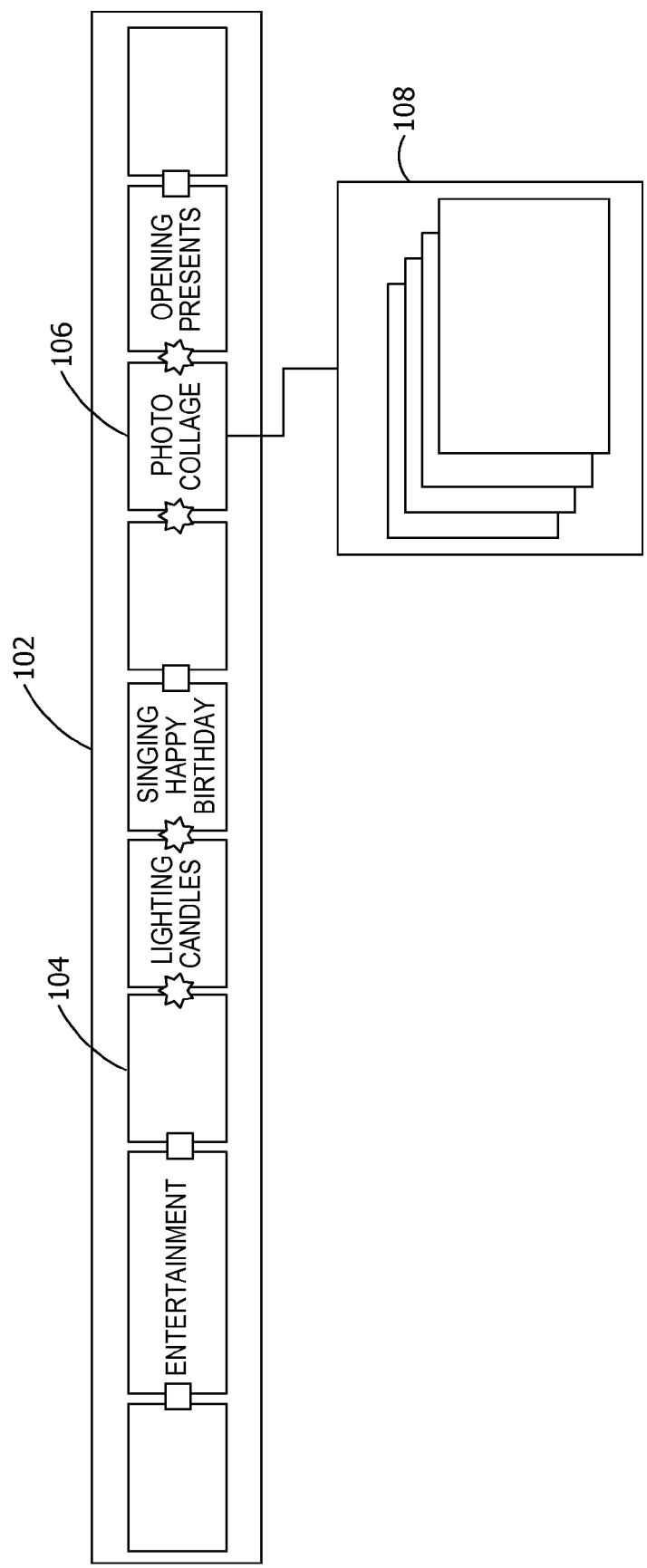
FIG. 1 is an exemplary block diagram illustrating a storyboard template having a plurality of cells therein.

Referring now to the drawings, an embodiment of the invention creates, based on user input, a storyboard or other timeline with input media content such as audio, video, still images, titles, credits, transitions, and effects to produce a desired output video. For example, the storyboard represents a linear collection of media content items arranged into cells according to a timeline. In particular, embodiments of the invention provide a storyboard 102 such as shown in FIG. 1 to a user for insertion of media content items selected by the user. The user interacts with the storyboard to associate selected media content items with the cells. For example, the user may rearrange the media content items on the storyboard. The storyboard 102 in FIG. 1 represents a well-structured arrangement of cells such as cell 104 to assist the user in creating the storyboard. The cells represent placeholders for the media content items. In an embodiment, each of the cells represents a collection of media content items that are grouped and have the same set of pre-defined properties. The properties, for example, describe the media content that may be associated with each of the cells. The resulting storyboard may be displayed to the user or written to a computer-readable medium.

After the user creates the original, initial, or example storyboard, this storyboard may be used as an example to create other storyboards. For example, aspects of the invention record editing decisions during creation of the example storyboard, or derive them from the example storyboard (e.g., by comparing the input media content with the output video). The editing decisions collectively comprise a user-specific style that may be applied to other input media content. For example, an embodiment of the invention analyzes the media content on the example storyboard to generate metadata. The user-specific style includes the generated metadata representing rules, properties, characteristics, constraints, restrictions, or the like that are applied to media content to create storyboards having consistent and aesthetically pleasing qualities.

In this manner, storyboards created based on the application of a particular user-specific style reflect the same editing techniques used to produce the example storyboard (e.g., on which the user-specific style is based).

Aspects of the invention combine the ease of use of an automatic editing system with the ability to specify the style and technique used to implement example-based video editing. Unlike video templates that are rigid and time consuming to use, the user-specific style in aspects of the invention automatically creates an edited storyboard using the content media specified. The user-specific style enables the user to create aesthetically pleasing and professional-looking videos with little or no editing. This approach greatly improves the flexibility to the novice or professional user.

In one embodiment, the user creates a plurality of user-specific styles that may be saved, re-used, and shared with other users. This enables the professional user to transfer video expertise to novice consumers or other users. Professionally created user-specific styles enable consumers to create professional-looking, high-quality videos. The user-specific styles may also be nested.

Referring further to FIG. 1, the storyboard 102 includes a cell 106 representing a nested set of elements 108 in the illustrated embodiment. The elements 108 correspond to other storyboards, a collection of media content items, or the like. For example, the cell 106 allows the user to add multiple photos to the storyboard cell 106. The cell properties associated with cell 106 determine how the nested elements 108 will be rendered in the output video.

Figure 2:
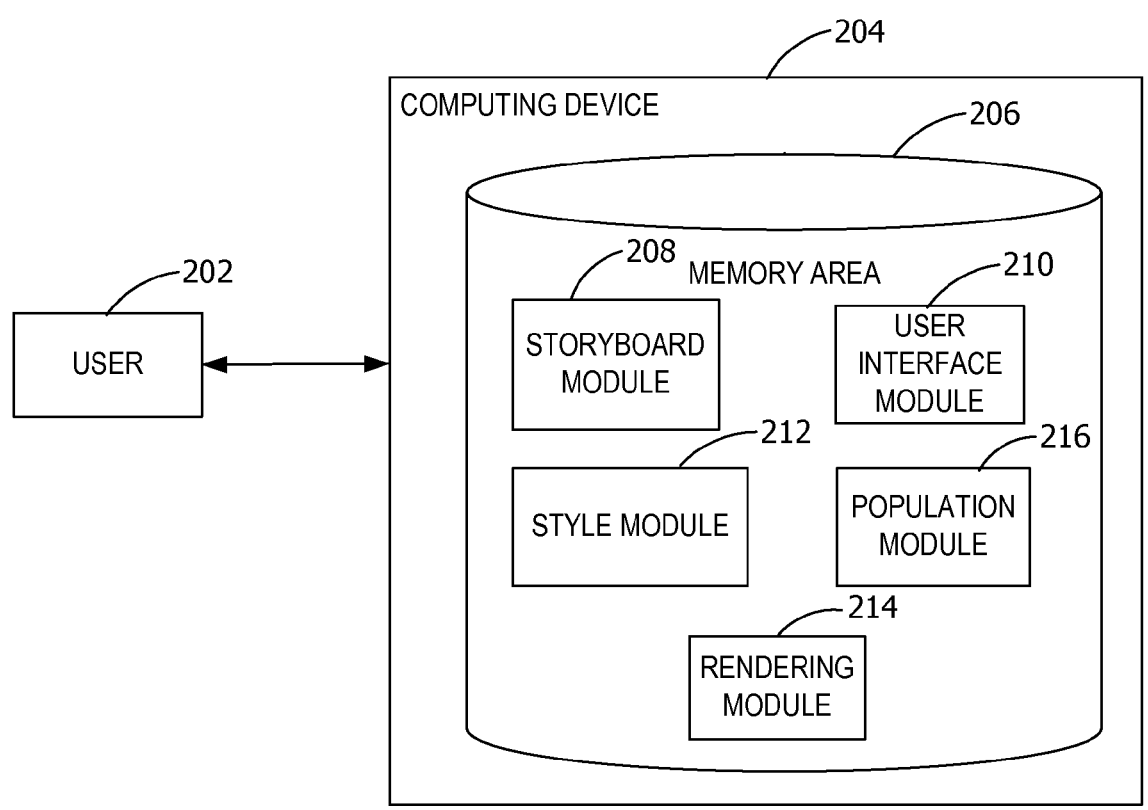
FIG. 2 is an exemplary block diagram illustrating a user interacting with a computing device to create a storyboard.

Referring next to FIG. 2, an exemplary block diagram illustrates a user 202 interacting with a computing device 204 to create a storyboard. The computing device 204 has access to a memory area 206 such as a computer-readable medium. While shown in FIG. 2 as being part of the computing device 204, the memory area 206 may also be located separately or remotely from the computing device 204. Computer readable media, which include both volatile and nonvolatile media, removable and non-removable media, may be any available medium that may be accessed by the computing device 204. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

In accordance with an embodiment of the invention, the memory area 206 represents one or more computer-readable media having computer-executable components for implementing aspects of the invention. In FIG. 2, the components include a storyboard module 208, a user interface module 210, a style module 212, a population module 216, and a rendering module 214. The storyboard module 208 defines a first storyboard having a first plurality of cells each for association with one or more of a first set of media content items.

The user interface module 210 receives the first set of media content items from a user for association with the first plurality of cells in the first storyboard. The user interface module 210 further receives editing decisions from the user for application to the first storyboard. The style module 212 analyzes the editing decisions and the first storyboard to define metadata representing a user-specific style associated with the first storyboard. The metadata includes a set of rules and logic for sequencing a storyboard. The style module 212 is responsible for analyzing the first storyboard to create the user-specific style. The metadata defines one or more cell properties describing the first plurality of cells in the first storyboard. The metadata further defines storyboard properties describing characteristics of the first storyboard.

The population module 216 applies the user-specific style to a second set of media content items provided by the user to populate a second plurality of cells in a second storyboard with the second set of media content items. The population module 216 converts the second set of media content items selected by the user to a new storyboard (e.g., the second storyboard) based on the user-specific style selected. The populated second plurality of cells conforms to the cell properties defined by the metadata associated with the user-specific style. The rendering module 214 combines the second storyboard from the population module 216 with the second set of media content items to produce audio/video data. The produced audio/video data may be displayed to the user 202 (e.g., via the user interface module 210) or written to a computer-readable medium (e.g., as a file).

Embodiments of the invention may be described in the general context of computer-executable instructions, such as program modules or components, executed by one or more computers or other devices. Generally, program modules or components include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

Figure 3:
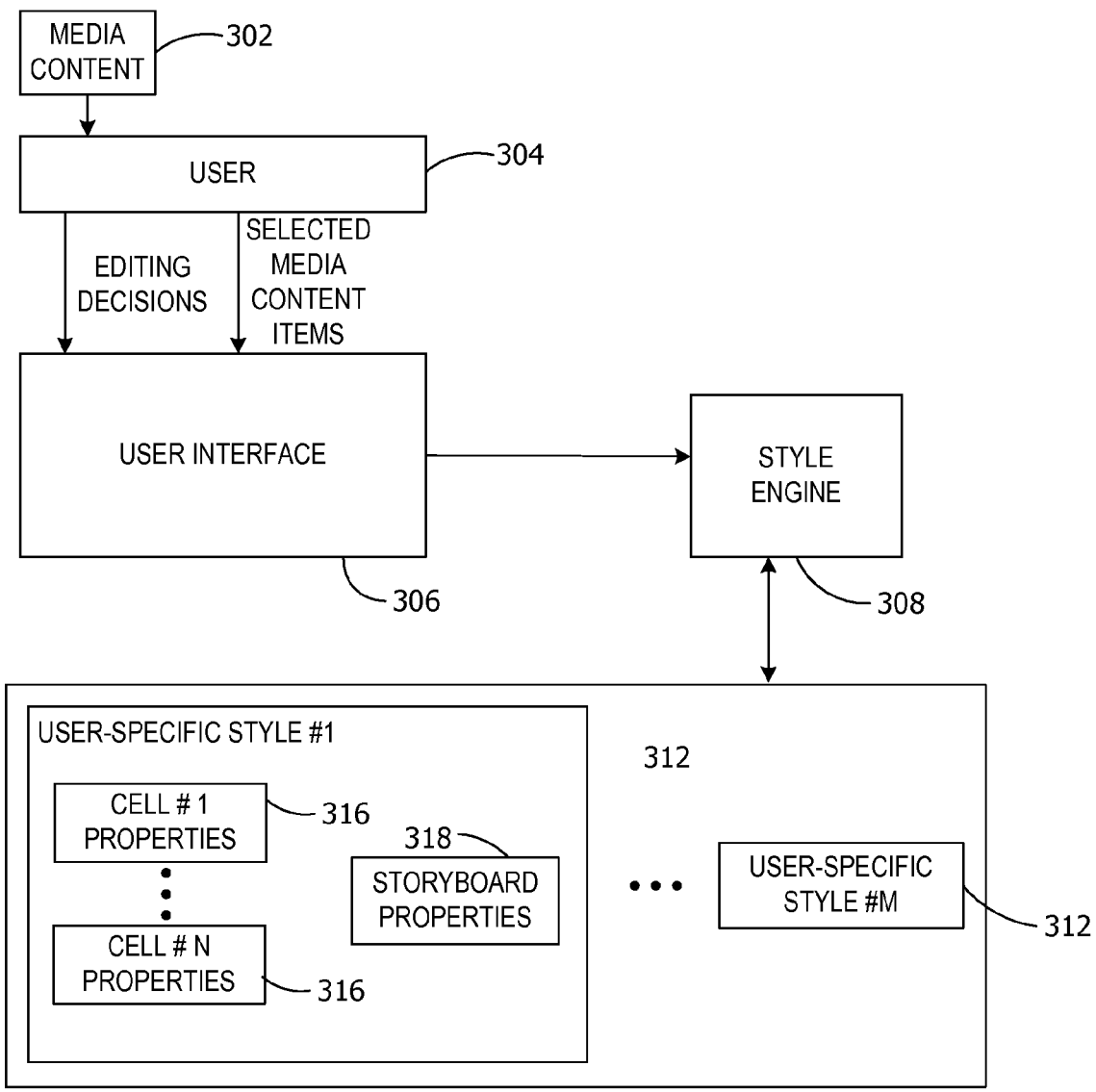
FIG. 3 is an exemplary block diagram illustrating components of an aspect of the invention for creating a user-specific style from an example storyboard.

Referring next to FIG. 3, an exemplary block diagram illustrates components of an aspect of the invention for creating a user-specific style 312 from input media content 302 and associated editing decisions. A user 304 interacts with a user interface 306 to create an example storyboard (e.g., storyboard 102) from a plurality of media content items. For example, the user 304 provides media content for inclusion in the example storyboard. The user 304 makes editing decisions regarding the example storyboard. The user edits the media content on the storyboard and performs editing tasks such as trimming a video clip, setting the duration of display of a photograph, adding a title or credit, adding a video fade transition between two storyboard cells, or applying a video effect to a video clip. For example, if creating a highlights video for a school soccer game, the user creates short video clips by trimming longer video clips and focusing on key events such as goals in the soccer game. The user trims or deletes long sections of slow moving or non-action portions. The soccer video may include a title and clips of each goal.

The example storyboard may be created by the user 304 from scratch, or from a predefined or default style. Exemplary predefined or default styles include birthdays, weddings, graduations, and vacations. Alternatively or in addition, the user 304 may select an event type, an occasion, or a theme from which to begin creation of the example storyboard. The user 304 is able to rearrange, add, and delete cells in the example storyboard.

A style engine 308 analyzes the editing decisions and the example storyboard to define metadata representing the user-specific style 312. The user-specific style 312 may be one of a plurality of user-specific styles 312 such as user-specific style #1 through user-specific style #M. The metadata defines at least one cell property 316 for each of the cells in the storyboard such as cell #1 properties through cell #M properties. The cell properties 316, for example, determine what media content items may be added to each cell and how the cell is rendered. Some cells may have no cell properties 312 or restrictions associated with them. Exemplary cell properties 312 are listed in Appendix A. The metadata further defines storyboard properties 318 associated with the example storyboard overall (e.g., overall characteristics of the example storyboard) rather than each individual cell. The storyboard properties 318 may also restrict what media content items may be added to particular cells or where a particular cell may be positioned within the storyboard (e.g., ordering). Exemplary storyboard properties 318 are listed in Appendix B.

In an embodiment, the style engine 308 includes computer-executable instructions for analyzing the media content added to the storyboard, the storyboard itself, and each cell within the storyboard to determine what rules and logic the user applied to each cell while editing the storyboard. The style engine 308 has a set of expandable rules and logic used to analyze and determine the style and technique the user performed when editing the example storyboard. The rules and logic represent techniques, known and unknown, for analyzing audio and video.

For example, the style engine 308 analyzes color histogram data for the media content of each cell and compares it to the corresponding unedited cell to determine the darkness and lightness of the input video clips. Another characteristic for analysis by the style engine 308 includes motion vectors. In this instance, style engine 308 determines how clips with various motion vector patterns are used based on the data from each cell. For example, the user creates a highlights video focusing on fast moving video while removing video clips with low motion vector values. The style engine 308 may also determine how much of the media content was excluded (e.g., trimmed) from the final storyboard. The analysts of various characteristics such as color histogram and motion vector helps determine a set of rules and logic for use by the style engine 308.

While the cell properties 316 and/or storyboard properties 318 are fixed in one embodiment, third-party developers or other users may alternatively write custom cell properties 316 or custom storyboard properties 318 in other embodiments. A customized cell property 312 includes, for example, a video filter that performs a customized function. For example, if the user 304 develops a face detection filter that automatically detects faces within a video clip, the user 304 may expose a custom face weighting property that determines the priority of video faces within the video clip.

In an embodiment, the user-specific style is stored as an extensible markup language (XML) file that stores the metadata representing the cell properties 316 and the storyboard properties 318. Appendix C lists exemplary XML code embodying exemplary metadata.

Figure 4:
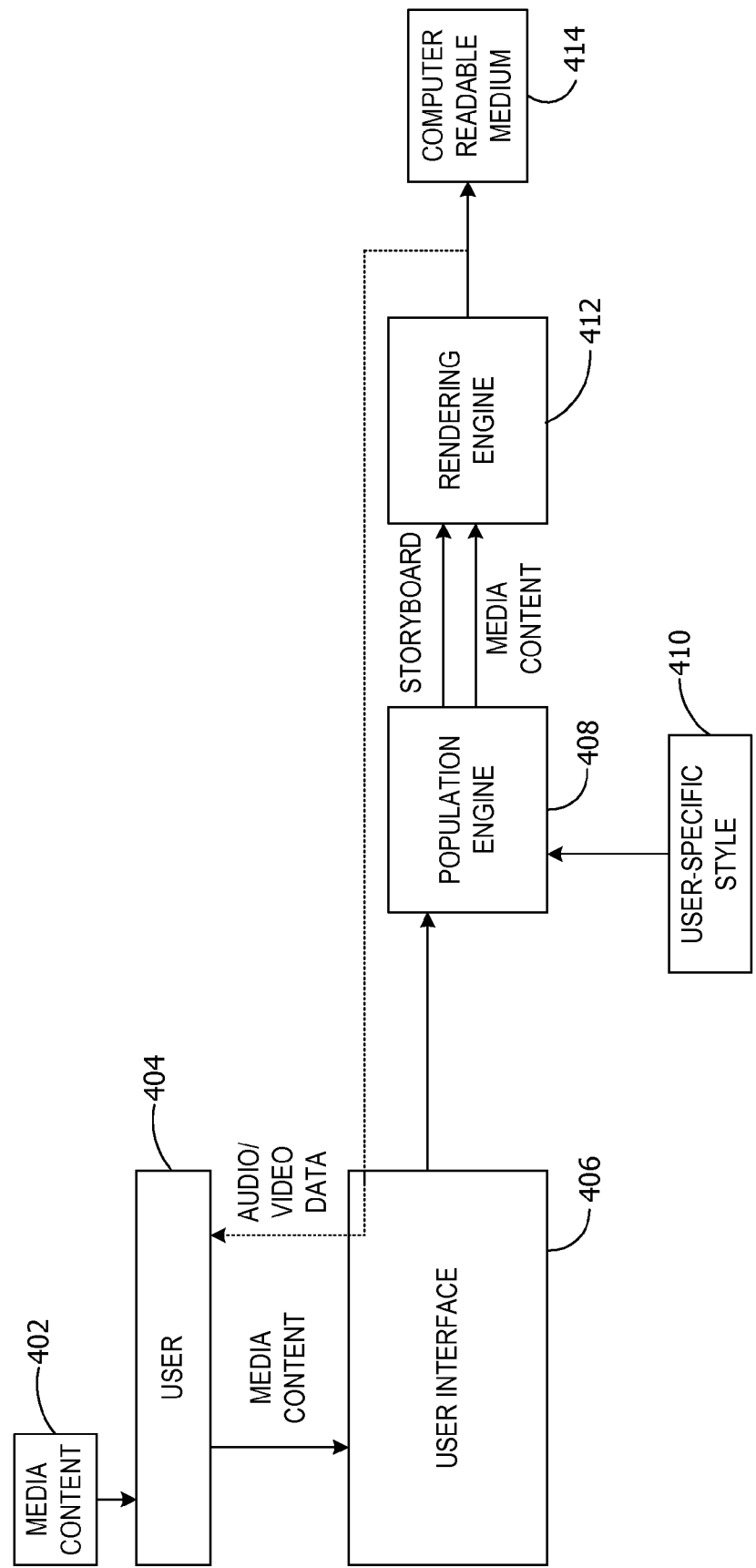
FIG. 4 is an exemplary block diagram illustrating components of an aspect of the invention for applying a user-specific style to input media content items.

Referring next to FIG. 4, an exemplary block diagram illustrates components of an aspect of the invention for applying a user-specific style to input media content items. A user 404 interacts with a user interface 406 to provide media content 402. A population engine 408 applies the user-specific style 410 (e.g., either a default style, or user-selected style) to the media content 402 to create a storyboard having a plurality of cells. The plurality of cells conforms to the cell properties (e.g., cell properties 316 in FIG. 3) defined by metadata associated with the user-specific style 410. For example, the population engine 408 applies the set of rules and logic derived from the editing of a first soccer video to a second soccer video. In an embodiment, audio elements (e.g., signature) of a portion of the input media content items are compared with audio elements of a portion of the audio elements from the example storyboard from which the user-specific style 410 was created. This facilitates accurate matching between the example project and the subject video.

In an embodiment, the population engine 408 processes the media content 402 enforcing the rules and logic associated with the user-specific style 410 (e.g., cell properties 316 and storyboard properties 318 in FIG. 3). The population engine 408 outputs a populated storyboard that properly sequences and edits the media content 402. The populated storyboard includes media content that has been edited using the same style and techniques the user applied to the example storyboard as described in FIG. 3. The automatic editing of the media content 402 may include, but is not limited to, trimming the video clips, setting the duration of photographs, removing content below a specified quality level, adding transitions between media content items such as a fade or dissolve, adding a graphic title or credit, applying video and photo effects such as color correction.

The rendering engine 412 includes computer-executable instructions for combining the created storyboard, pipeline, timeline, or the like, with the corresponding portions of the media content 412 to produce output audio/video data. The audio/video data may be recorded onto a computer-readable medium 414 such as in a file or on a hard disk, or optionally rendered directly to the user 404 via the user interface 406. In an embodiment, the rendering engine 412 obtains the selected media content items from the user 404 directly, from a memory area storing the selected media content items received from the user 404, or from the population engine 408. Empty cells in the storyboard are ignored by the rendering engine 412. The rendering engine 412 may provide feedback to the user interface 406, thus enabling the user 404 to better understand how the video will be rendered (e.g., a preview).

Figure 5:
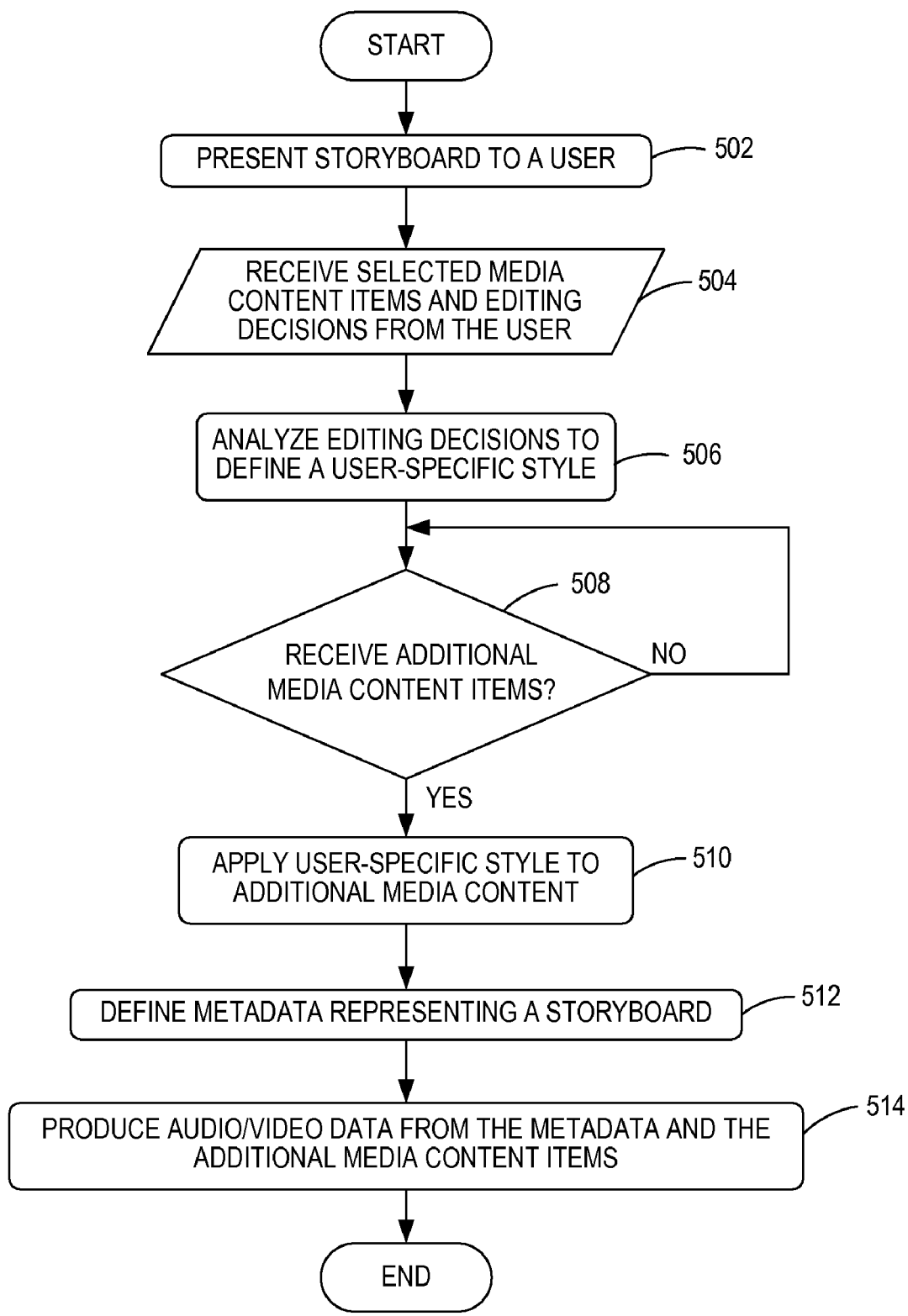
FIG. 5 is an exemplary flow chart illustrating operation of aspects of the invention.

Referring next to FIG. 5, a flow chart illustrates exemplary video editing operations. A video editing system embodying aspects of the invention presents a first storyboard to a user at 502 (e.g., based on a user selection of a theme or other default storyboard). Selected media content items and editing decisions regarding the selected media content items and the first storyboard are received from the user at 504. For example, the user may drag and drop or cut and paste the selected media content items onto one or more cells in the storyboard template via a user interface. Audio/video data (e.g., a movie) is generated from the first storyboard.

The editing decisions are analyzed at 506 to define a user-specific style. Subsequently, additional media content items may be received at 508. If requested by the user, the user-specific style is applied at 510 to the additional media content items received at 508 to generate a second storyboard. For example, the editing decisions applied to the previously received set of media content items are applied to the additional media content items received subsequently. Metadata representing the second storyboard is defined at 512. The metadata represents properties defining each cell in the storyboard as well as properties defining the overall storyboard. In an embodiment, the defined metadata identifies a sequence of the media content items within each of the cells. The second storyboard is combined with the additional media content items to produce audio/video data.

In this manner, the audio/video data associated with the second storyboard is similar to the audio/video data associated with the first storyboard.

The following examples further illustrate aspects of the invention. The tables below list properties and property values for a cell in a storyboard. The properties and property values are derived from an analysis of editing decisions made by users to input video. For example, two users made different decisions when editing a soccer game. Each table includes exemplary characteristics that aspects of the invention use to define a user-specific style. The information in the tables below is only an exemplary and non-limiting representation of a portion of the rules and logic used to define the user-specific style.

Table I below lists properties and corresponding property values for a cell in a storyboard representing a highlight video. Table II below lists properties and corresponding property values for a cell in a storyboard representing a full documentary video.

TABLE I

Exemplary Property Values for a Cell in a Highlight Storyboard.

| Highlight | Goal | Goal Attempt | Goal block | Goal | Goal |
|---|---|---|---|---|---|
| Cell | A | B | C | D | E |
| Start transition | Slide | Wipe | Fade | Wipe | Page Curl |
| Duration | 30 | 20 | 45 | 60 | 20 |
| Color | 75 | 85 | 90 | 75 | 65 |
| Motion | 70 | 50 | 85 | 80 | 90 |
| Number of faces | 2 | 4 | 3 | 2 | 3 |
| Mark-in | 20 | 10 | 30 | 40 | 10 |
| Mark-out | 10 | 30 | 20 | 20 | 20 |
| Timecode | :00:10 | 05:05 | 20:00 | 25:00 | 35:00 |
| DSP Audio Matching | 90 | 90 | 95 | 85 | 90 |
| Video effect | None | None | None | None | Slow |

In the example of Table I, the user edits the original media content and chooses only highlight clips that demonstrate key events during the soccer game. Each video clip occurs over a wide range of times throughout the game. The user has edited the video to mostly include close-up shots with just a few people in the scene. In this scenario, aspects of the invention detect a limited number of faces, or players on the field. The audio track is also analyzed, and aspects of the invention determine patterns that are common among the video clips. In the example of Table I, the patterns include short whistle bursts and crowd noise. The user chooses not to include sections of video without these audio characteristics present. The user also chooses to keep each video clip short by deleting most video clips and trimming out large sections. The user uses more complex transitions to keep the video fast-paced, and to allow the viewer to recognize that time has passed and that a key event is taking place.

TABLE II

Exemplary Property Values for a Cell in a Documentary Storyboard.

| Documentary Cell | A | B | C | D | E | F | G | H |
|---|---|---|---|---|---|---|---|---|
| Start transition | Fade | Cut | Wipe | Cut | Cut | Fade | Page | Cut |
| Duration | 4:00 | 6:00 | 3:00 | 7:00 | 5:00 | 6:00 | 3:00 | 4:00 |
| Color | 65 | 75 | 55 | 65 | 45 | 60 | 50 | 65 |
| Motion | 35 | 20 | 70 | 30 | 15 | 25 | 20 | 35 |
| Number of faces | 5 | 6 | 4 | 7 | 4 | 6 | 3 | 3 |
| Mark-in | :10 | 0 | :10 | :20 | :0 | :25 | :20 | 10 |
| Mark-out | :15 | :00 | :15 | :10 | :20 | :10 | :15 | :10 |
| Timecode | 4 | 10 | | | | | | |

In the example of Table II, the user creates a documentary of the soccer game. The intent of the user is to document the entire event rather than just creating a highlights video. Compared to the example corresponding to Table I, the user in this instance includes significantly more media content in the storyboard and makes fewer edits to each of the video clips. As such, the total duration of the resulting movie is much longer, and the overall pace of the movie is slower. Most of the transitions are "fade and cut" which creates more continuity between video clips. The video clips have more wide shots showing more players on the field. The user focuses on a few significant events that include audio signatures, but reserves the use of flashy transitions and special effects.

The figures, description, and examples herein as well as elements not specifically described herein but within the scope of aspects of the invention constitute means for defining a user-specific, storyboard style having a plurality of cells each for association with one or more media content items, and means for creating a user-specific, storyboard style based on editing decisions from the user.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, the computing device such as computing device 204 in FIG. 2 executes computer-executable instructions such as those illustrated in the figures to implement aspects of the invention. Aspects of the invention include the computing device itself when programmed according to the methods and techniques described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Table A1 below lists exemplary cell properties and description of each of the cell properties resulting from application of rules and logic used when analyzing an example storyboard to define a user-specific style.

TABLE A1

Exemplary Cell Properties.

| CELL PROPERTY | DESCRIPTION |
| --- | --- |
| Titles | The label shown on the storyboard or timeline. |
| Ordering | Determines where on the timeline the cell can be positioned. Examples include Start, End, Fixed, Any. If the value start is choose, the cell automatically is positioned at the start of the storyboard template. In an embodiment, the user cannot arrange this item to another location on the storyboard. If more than one storyboard cell has the ordering position of start, the priority property below is then used to determine the position. If both have the same priority, then the cell is ordered based on the start time of the content in the cell. |
| Effects | Specifies the effects that are automatically applied to the media items added to the cell. Each effect may have its own set of customized properties. |
| Start Transitions | Specifies the start transition for the storyboard cell. The cell properties also determine if the user can override the start transition. |
| End Transition | Specifies the end transition for the storyboard cell. If the end transition overlaps an existing start transition, the priority property for the cells determines what final transition is used. The storyboard properties may also determine what transitions are used. The cell properties also determine if the user can override the end transition. |
| Audio effects | Specifies the default auto effects to be added to the cell (e.g., cross-fade between cells). |
| Duration | Specifies the min and max duration of the cell. The cell can determine the min and max duration of each cell. This is especially helpful when photos are added to cells. |
| Title/caption | Specifies the title or caption to render for the cell. The title may have additional properties that determine how the title is display and how it may be customized by the user. |
| Color | Specifies the amount of color or brightness for video. Video not meeting this requirement maybe removed in an embodiment. |
| Motion | Specifies the amount of motion allowed for video. Video not meeting this requirement maybe removed in an embodiment. |
| Photo Flash | Determine the weight of video clips with detected photoflashes. Photoflashes typically indicate video with key shots and should be included in the finalized video. |
| Custom | Third-party developers may provide additional custom properties that may be applied to each cell. |
| Audio Digital Signal Processing Signatures | |

APPENDIX B

Table B1 below lists exemplary storyboard properties and descriptions of each of the storyboard template properties.

TABLE B1

Exemplary Storyboard Template Properties.

| STORYBOARD TEMPLATE PROPERTY | DESCRIPTION |
| --- | --- |
| Duration | Total duration of the storyboard |
| Included effects | Included set of transitions used on the storyboard |
| Excluded transition | Included transitions used on the storyboard |
| Title | Title used |
| Credits | Credits used |
| Max clip duration | Max clip duration used on the storyboard |
| Min clip duration | Min clip duration used on the storyboard |
| Average Motion vector | Determine the average motion rating for each cell |
| Average Color histogram | Determine the average color histogram for each cell |
| Custom | Third-party developers may provide additional custom properties that can be applied to the storyboard. |

APPENDIX C

The exemplary XML code below represents exemplary metadata for a storyboard.

```xml
<?xml version="1.0" encoding="utf-8" ?>
<Subshots>
    <Subshot Start="10.0" End="20.0" Entropy="0.665"
    Boundary="0.2271">
        <ColorHistogram>
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
        </ColorHistogram>
        <Motions>
            <Motion Start="10.0" End="15.0" Pattern="0" Intensity="0.0" />
            <Motion Start="15.0" End="20.0" Pattern="2" Intensity="0.3" />
        </Motions>
    </Subshot>
    <Subshot Start="20.0" End="32.0" Entropy="0.565" Boundary="0.552">
        <ColorHistogram>
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
        </ColorHistogram>
        <Motions>
            <Motion Start="20.0" End="24.0" Pattern="5" Intensity="0.5" />
            <Motion Start="24.0" End="30.0" Pattern="0" Intensity="0.0" />
            <Motion Start="30.0" End="32.0" Pattern="7" Intensity="0.8" />
        </Motions>
    </Subshot>
</Subshots>
```

What is claimed is:

1. A method for use with storyboards, each of which represents a plurality of cells arranged according to a timeline, said method comprising:

presenting a first storyboard to a user, wherein the first storyboard represents a plurality of cells arranged according to a timeline;

receiving first media content items from the user for association with one or more of a first plurality of cells in the first storyboard, at least a first cell of the first plurality of cells receiving a nested plurality of storyboards different from the first storyboard;

receiving editing decisions from the user for editing the first media content items in the first storyboard;

analyzing at least one of color histogram information and motion vector information of the first storyboard based on the received editing decisions;

based on said analysis, determining one or more changes to each of the first media content items;

based on the received editing decisions and the determined changes, defining a user-specific style associated with each of the first plurality of cells of the first storyboard, said user specific style specifying at least the following cell properties for each cell:

a start transition effect;

an end transition effect;

a priority property for determining, when said end transition effect of said each cell overlaps with a start transition effect of a next cell of the first storyboard, which transition is used; and whether the user can override said end transition effect;

said user specific style further defining a rendering order of the nested plurality of storyboards, said user specific style further comprising nested user-specific styles, each of the nested user-specific styles corresponding to one of the nested plurality of storyboards;

analyzing the edited first media content items and the first storyboard to define, without any further user input, metadata representing the user-specific style, said metadata defining one or more cell properties associated with each of the first plurality of cells in the first storyboard, said metadata further defining storyboard properties describing characteristics of the first storyboard, wherein said storyboard properties are different from said one or more cell properties;

overriding a defined value for a corresponding one of the cell properties with a defined value for at least one of the storyboard properties when said defined value for at least one of the storyboard properties conflicts with said defined value for the corresponding one of the cell properties;

applying the user-specific style to second media content items provided by the user to create a second storyboard having a second plurality of cells, said second plurality of cells conforming to the cell properties defined by the metadata associated with the user-specific style associated with each of the first plurality of cells of the first storyboard, said applying further comprising selecting, based on the cell properties, a subset of less than all of the second media content items for association with the second plurality of cells;

combining the created second storyboard with the second media content items to produce output data including at least one of output audio data and output video data;

displaying the output data to the user; and when the user is permitted to override the end transition effect, receiving from the user changes to the end transition effect and applying the changes to the end transition effect.

2. The method of claim 1, further comprising storing the output data on a computer-readable medium.

3. The method of claim 1, wherein the second storyboard identifies a sequence of the second media content items within each of the second plurality of cells.

4. The method of claim 1, wherein receiving the first media content items comprises receiving, via a drag and drop model in a user interface, the first media content items into the first plurality of cells in the first storyboard.

5. The method of claim 1, wherein receiving the first media content items comprises receiving, via a cut and paste model in a user interface, the first media content items into the first plurality of cells in the first storyboard.

6. The method of claim 1, further comprising receiving from the user a user-defined cell property for association with one of the first plurality of cells in the first storyboard.

7. The method of claim 1, wherein one or more computer-readable media have computer-executable instructions for performing the method of claim 1.

8. A system comprising:

a memory area for storing a plurality of storyboard styles, said storyboard styles each having a plurality of cells for association with one or more media content items, said cells each having one or more cell properties describing media content for association therewith, said storyboard styles further each having one or more storyboard properties describing characteristics of the storyboard style; and a processor configured to execute computer-executable instructions for:
  receiving from a user a selection of one of the plurality of storyboard styles stored in the memory area;
  presenting the selected storyboard style to the user;
  receiving first media content from the user for association with the plurality of cells in the presented storyboard style to create a first storyboard;
  receiving editing decisions from the user for application to the first storyboard;
  modifying the presented storyboard style with the received editing decisions;
  analyzing at least one of color histogram information and motion vector information of the modified storyboard;
  based on said analysis, comparing media content of each cell in the first storyboard to media content in a corresponding cell in the modified storyboard;
  determining, based on results of said comparing, rules implementing predefined techniques for analyzing audio and video corresponding to said editing decisions of the user, said determining comprising determining at least the following cell properties for each cell:
    a start transition effect;
    an end transition effect;
    a priority property for determining, when said end transition effect of said each cell overlaps with a start transition effect of a next cell of the first storyboard, which transition effect is used; and
    whether the user can override said end transition effect;
  receiving second media content from the user for association with a second storyboard;
  applying the determined rules to the received second media content to create the second storyboard, said applying further comprising selecting, based on the determined rules, a subset of less than all of the second media content for creating the second storyboard;
  presenting the second storyboard to the user as output data including at least one of audio data and video data; and
  when the cell properties permit the user to override the end transition effect, receiving from the user changes to the end transition effect and applying the changes to the end transition effect.

9. The system of claim 8, wherein each of the plurality of storyboard styles stored in the memory area correspond to one or more of the following: an event type, a style, an occasion, and a theme.

10. The system of claim 8, wherein the processor is configured to execute computer-executable instructions for receiving from the user a user-defined storyboard property for association with at least one of the storyboard styles.

11. The system of claim 8, wherein the processor is configured to execute computer-executable instructions for analyzing the second media content based on the cell properties.

12. The system of claim 8, further comprising means for defining a storyboard style having a plurality of cells each for association with one or more media content items.

13. The system of claim 8, further comprising means for creating a storyboard style based on the received editing decisions.

14. One or more computer-readable storage media having computer-executable components, said components comprising:

a storyboard module for defining a first storyboard having a first plurality of cells each for association with one or more first media content items, at least a first cell of the first plurality of cells associated with a nested tree of elements, said elements comprising a plurality of storyboards different from the first storyboard, wherein the first storyboard and each of the plurality of storyboards comprises a plurality of cells in a linear timeline;

a user interface module for receiving the first media content items from a user for association with the first plurality of cells in the first storyboard, said user interface module further receiving editing decisions from the user for application to the first storyboard;

a style module for:
  analyzing at least one of color histogram information and motion vector information of the first storyboard based on the editing decisions;
  based on said analysis, determining one or more changes to each of the first media content items;
  analyzing the editing decisions, the determined changes, and the first storyboard to define metadata representing a user-specific style associated with the first storyboard, said metadata defining one or more cell properties describing the first plurality of cells in the first storyboard, said one or more cell properties comprising, for each cell:

a start transition;

an end transition;

a priority property for determining, when said end transition of said each cell overlaps with a start transition of a next cell of the first storyboard, which transition is used, said metadata further defining storyboard properties describing characteristics of the first storyboard, said storyboard properties different from said one or more cell properties, said style module overriding a defined value for a corresponding one of the cell properties with a defined value for at least one of the storyboard properties when said defined value for at least one of the storyboard properties conflicts with said defined value for the corresponding one of the cell properties, said analyzing further comprising analyzing at least one of color histogram information and motion vector information of each cell of the first storyboard by comparing media content items in said each cell before and after the editing decisions have been applied to said each cell to determine rules implementing predefined techniques for analyzing audio and video corresponding to said editing decisions, said metadata including said determined rules, said storyboard properties defined by said metadata including a rendering order for all elements of the nested tree and including nested user-specific styles, each nested user-specific style corresponding to one of the elements of the nested tree;

a population module for applying the user-specific style to second media content items provided by the user to populate a second plurality of cells in a second storyboard with the second media content items, said populated second plurality of cells conforming to the cell properties defined by the metadata associated with the user-specific style, said applying further comprising selecting, based on the cell properties, a subset of the second media content items for association with the second plurality of cells; and a rendering module for combining the second storyboard from the population module with the second media content items to produce output data including at least one of audio data and video data;

wherein the user interface module presents the output data produced by the rendering module to the user, wherein the user interface module allows the user to edit the output data produced by the rendering module to the user prior to rendering the produced output data, and wherein the one or more cell properties defined by the style module further comprises a cell property specifying whether the user can edit the end transition effect.

15. The computer-readable storage media of claim 14, wherein the user interface module displays, to the user, the output data produced by the rendering module.

16. The computer-readable storage media of claim 14, wherein the rendering module combines the first storyboard with the first media content items to produce the output data.

* * * * *